US012636778B2

(12) United States Patent
Sheng et al.

(10) Patent No.: US 12,636,778 B2
(45) Date of Patent: May 26, 2026

(54) INTELLIGENT SCHEDULING SYSTEM FOR CONSTRUCTION ROBOT AND METHOD FOR GENERATING AN INTERPRETATION

(71) Applicant: Feng Chia University, Taichung City (TW)

(72) Inventors: Yu-Ting Sheng, Taichung City (TW); Shih-Yuan Wang, Taichung City (TW)

(73) Assignee: Feng Chia University, Taichung City (TW)

( * ) Notice: Subject to any disclaimer, the term of this patent is extended or adjusted under 35 U.S.C. 154(b) by 302 days.

(21) Appl. No.: 18/337,573

(22) Filed: Jun. 20, 2023

(65) Prior Publication Data

US 2024/0383131 A1 Nov. 21, 2024

(30) Foreign Application Priority Data

May 17, 2023 (TW) .................................. 112118397

(51) Int. Cl.
*B25J 9/16* (2006.01)
(52) U.S. Cl.
CPC ............. *B25J 9/163* (2013.01); *B25J 9/1689* (2013.01)
(58) Field of Classification Search
CPC .............................. B25J 9/163; B25J 9/1689
See application file for complete search history.

(56) References Cited

U.S. PATENT DOCUMENTS

| | | | | |
|---|---|---|---|---|
| 9,070,216 | B2 * | 6/2015 | Golparvar-Fard | .... G06T 19/006 |
| 9,858,712 | B2 * | 1/2018 | Stathis | ................... G05D 1/024 |
| 10,460,173 | B2 * | 10/2019 | Sasson | ................... G06Q 50/08 |
| 11,288,412 | B2 * | 3/2022 | Golparvar-Fard | ...... G06F 30/13 |
| 11,381,726 | B2 * | 7/2022 | Zass | ................. G06Q 10/06316 |
| 11,481,853 | B2 * | 10/2022 | Bellaish | ................. G06N 20/00 |
| 12,182,960 | B1 * | 12/2024 | Rong | .................... G06V 20/52 |
| 12,412,004 | B2 * | 9/2025 | Rong | ...................... G06F 30/13 |
| 12,462,424 | B2 * | 11/2025 | Török | .................... G01C 11/02 |
| 2011/0043515 | A1 * | 2/2011 | Stathis | .................. G05D 1/027 434/118 |
| 2018/0012125 | A1 * | 1/2018 | Ladha | .................... G06N 3/044 |
| 2019/0235733 | A1 * | 8/2019 | Stubler | .............. G06F 3/03542 |
| 2023/0316567 | A1 * | 10/2023 | Török | ..................... G06T 7/579 382/103 |
| 2024/0181639 | A1 * | 6/2024 | Kumar | .................... B25J 5/007 |

* cited by examiner

*Primary Examiner* — Jason Holloway
*Assistant Examiner* — Madison B Emmett
(74) *Attorney, Agent, or Firm* — Best & Flanagan LLP

(57) ABSTRACT

An intelligent construction robot system having a learning module that performs machine learning based on point cloud data and building information data during a machine learning phase to generate a building model and store it; and a judging module that evaluates the similarity between the point cloud data and each of the building models during a machine interpretation phase to determine whether to use the building model with the highest similarity or to generate another building model, and the judging module generates a construction schedule corresponding to the building model.

6 Claims, 4 Drawing Sheets

100

S1

Loading a BIM data and a point cloud data — S1-1

Applying an image segmentation technique to the image data and combining it with the BIM data for machine learning to form a building model — S1-2

Storing the building model in a model database — S1-3

S2

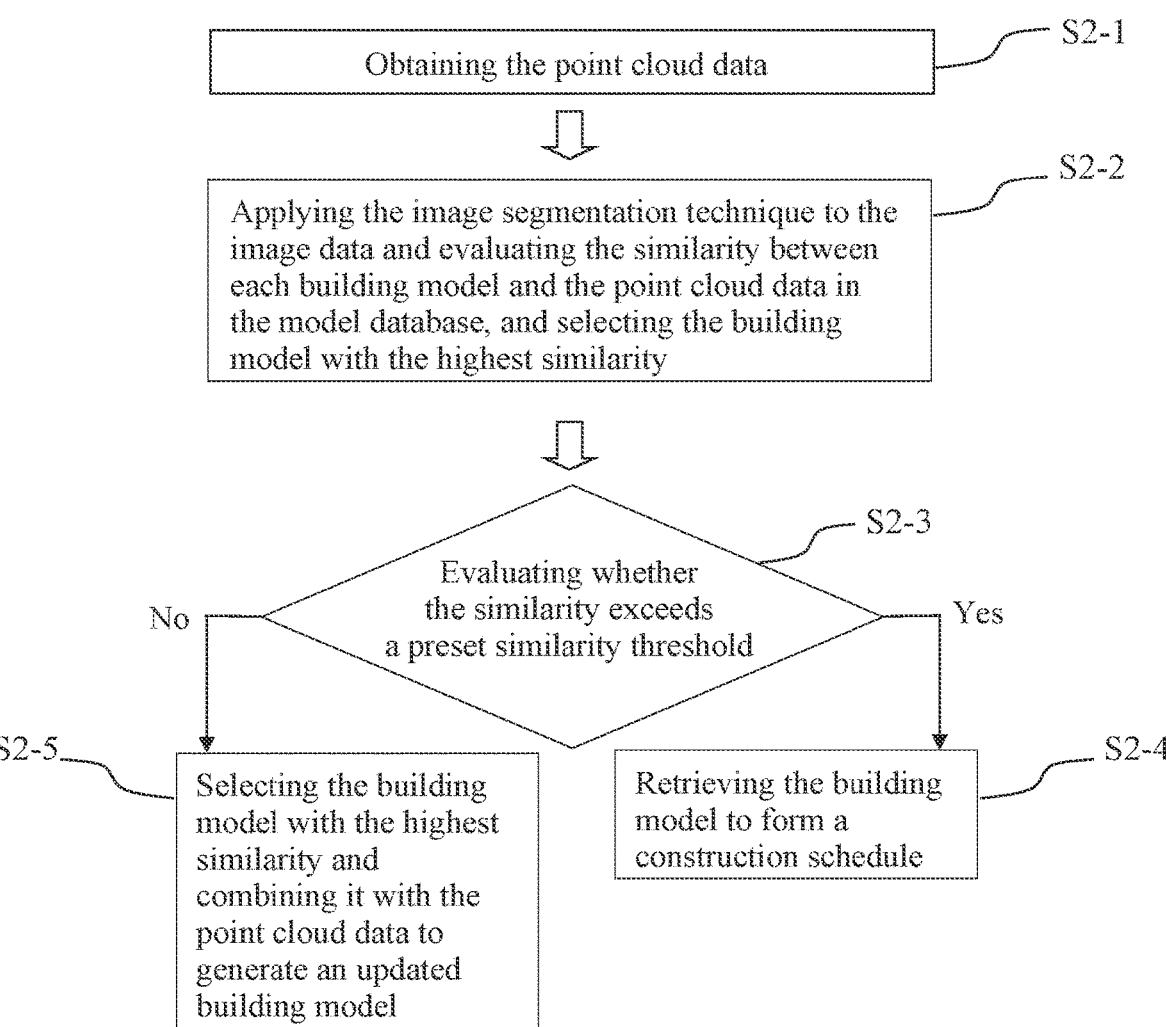

Obtaining the point cloud data — S2-1

Applying the image segmentation technique to the image data and evaluating the similarity between each building model and the point cloud data in the model database, and selecting the building model with the highest similarity — S2-2

Evaluating whether the similarity exceeds a preset similarity threshold — S2-3

No

Yes

S2-5 — Selecting the building model with the highest similarity and combining it with the point cloud data to generate an updated building model Retrieving the building model to form a construction schedule — S2-4

FIG.3

INTELLIGENT SCHEDULING SYSTEM FOR CONSTRUCTION ROBOT AND METHOD FOR GENERATING AN INTERPRETATION

FIELD OF INVENTION

A construction robot, in particular an intelligent scheduling system, and a method for generating an interpretation thereof.

BACKGROUND OF THE INVENTION

With the booming development of intelligent technology, the use of artificial intelligence to replace manpower has become an irresistible trend in global industrial automation and intelligent manufacturing. In the current construction industry, due to the severe shortage of professional manpower and the resulting construction safety problems, construction automation has emerged accordingly. Building Information Modeling (BIM) is a building model created by BIM, which is widely used in the current construction industry to simulate the real information of the building.

However, in the field of BIM technology, the building environment parameters contained in the BIM are not accurately integrated with the actual construction environment parameters (such as the actual room size, the actual window and door locations, etc.). If people want to further import the existing BIM into the robot to make it perform construction work in the construction environment, due to the building environment parameters usually cannot effectively reflect the real construction environment parameters, so the robot still needs to be monitored by the technicians in real time, and the robot is also prone to perform wrong construction procedures, which needs to be corrected by the technicians, leading to the burden of labor costs.

SUMMARY OF THE INVENTION

In light of the above, the purpose of the present invention is to provide an intelligent construction robot system that can effectively overcome the aforesaid problem that BIM fails to integrate construction robots and effectively reflect the real building and construction environment. The present invention provides an intelligent construction robot system comprising: a construction robot for capturing at least one of the point cloud data, a control center communicatively connected to the construction robot, comprising: a learning module for performing machine learning based on at least one of the point cloud data and at least one of the building information data during a machine learning phase, and generating at least one building model and storing it in a model database; and a judging module that evaluates a similarity between the point cloud data and each of the building models during a machine interpretation phase to determine whether to use the building model having the highest similarity or to generate another building model, for which the judging module generates a construction schedule corresponding to that building model.

The present invention further provides a method for generating an interpretation of the intelligent construction robot system, comprising:

a machine learning phase, the steps include:

loading at least one building information data and capturing at least one point cloud data, the point cloud data containing a construction environment parameter and an image data;

applying an image segmentation technique to the image data, combining the construction environment parameters and the building information data for machine learning to form a building model; and storing the building model in a model database; and a machine interpretation phase, the steps include:

obtaining the point cloud data corresponding to a construction environment containing the construction environment parameters and the image data corresponding to the construction environment; and applying the image segmentation technique to the image data and combining the construction environment parameters to evaluate the similarity of each building model in the model database to the point cloud data to determine whether to use the building model with the highest similarity or to update the building model.

Wherein, the judging module provides the construction robot with a construction instruction in accordance with the construction schedule; the construction robot contains an execution unit that receives the construction instruction provided by the judging module and executes a construction procedure in the construction environment in accordance with the construction instruction.

Wherein, the execution unit feedback on the construction progress to the control center, and the judging module updates the construction schedule of the building model and stores it in the model database.

Wherein, a plurality of the construction robots are communicatively connected to the control center, and the judging module generates the corresponding construction model according to the plurality of the point cloud data, and gives the construction instructions to the plurality of the construction robots individually simultaneously, and mobilizes the construction robots among the building models according to each construction schedule updated by each construction progress of the building models.

Wherein, a positioning system comprising a total station is communicatively connected to the control center. When the total station is installed in the construction environment, the building model records an absolute position of the total station; at least one environmental reflector is installed at any place in the construction environment, the total station uses an optical path to obtain an absolute point of the environmental reflector corresponding to the building model; and at least one dynamic reflector is installed at any place on the construction robot, the total station uses the principle of the optical signal, the absolute position, and the absolute point to obtain a relative point of the dynamic reflector corresponding to the building model.

Summarizing the above description of the implementation method and embodiments, the intelligent construction robot system and the method for generating the interpretation provided by the present invention could produce the following effects:

1. Through the machine learning phase, the intelligent construction robot system generates the building model including both the actual construction environment parameters of the construction environment and its building data, thus avoiding the problem that the construction environment and the data are incompatible with each other during the construction in the past, which would affect the construction efficiency.

2. Through the judging module to execute the machine interpretation phase, only the point cloud data can be used to form the corresponding building model, so that even if the intelligent construction robot system is used in a new construction environment, it can directly generate a new building model, without having to return to the machine learning phase to combine with the data, so that the intelligent construction robot system can be applied mechanically, saving the preliminary preparation time.

3. When there are multiple construction robots working together, the judging module can use the updated construction schedules to mobilize the construction robots between the building models and the multiple construction schedules.

4. Through the technology of combining the positioning system and the building model, the intelligent construction robot system can monitor the relative point of each construction robot in real time, and achieve the effect of immediate correction to reduce the error rate.

BRIEF DESCRIPTION OF THE DRAWINGS

FIG. 3 is a flowchart of the preferred embodiment of the machine interpretation phase of the present invention.

DETAILED DESCRIPTION OF THE PREFERRED EMBODIMENTS

Figure 1:
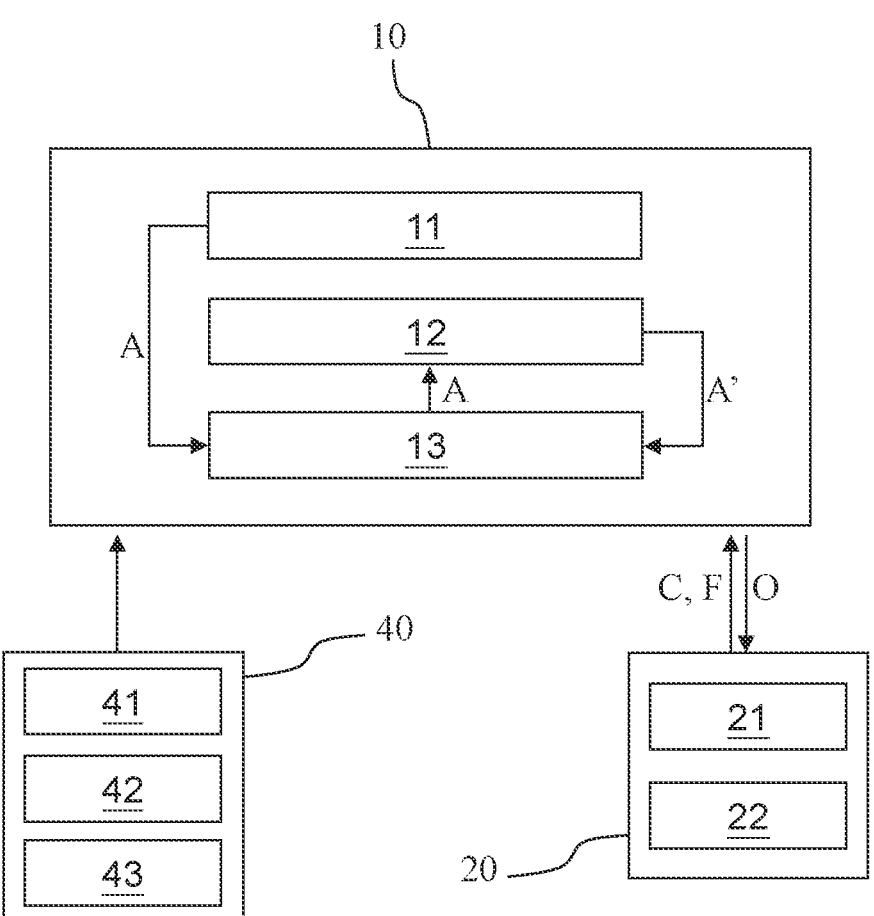
FIG. 1 is a system diagram of the preferred embodiment of the present invention.

Referring to FIG. 1, which is a schematic diagram of a preferred embodiment of the intelligent construction robot system 100 provided by the present invention. The intelligent construction robot system 100 comprises a control center 10 and a construction robot 20. The control center may be executed by a computer device (not shown), which refers to electronic hardware and software having input, output, computation, and control functions and, better yet, having a visual interface, which is a technology of general knowledge and will not be described herein. The control center 10 is communicatively connected to the construction robot 20, and the control center 10 may also be integrated with the construction robot 20 in the form of the computer device installed in the construction robot 20.

Figure 2:
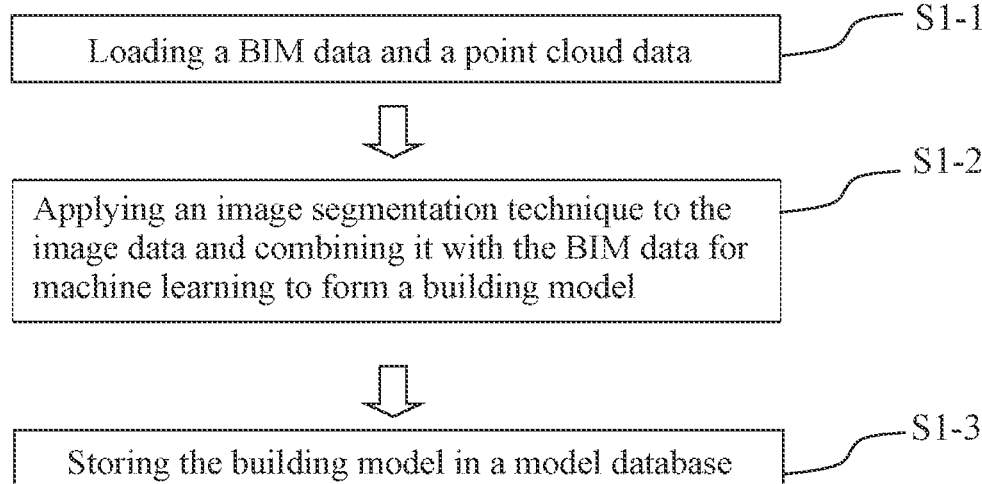
FIG. 2 is a flowchart of the preferred embodiment of the machine learning phase of the present invention.

Referring to FIG. 2, the control center 10 comprises a learning module 11, a judging module 12, and a model database 13. Wherein the learning module 11 is used in the intelligent construction robot system 100 to perform a machine learning phase S1, and a building model A is generated and stored in the model database 13 during the machine learning phase S1. Wherein, the method and steps for executing the machine learning phase S1 will be described in detail in the following paragraphs.

The model database 13 can be loaded into a Building Information Modeling (BIM) database by means of information linking or importing and is hereinafter referred to as the BIM database for description. The BIM database stores multiple duplicate BIM data for the learning module 11 to access during the machine learning phase S1, and the model database 13 simultaneously stores multiple duplicate building models A generated from the learning module 11.

Next, referring to FIG. 3, the judging module 12 is used in the intelligent construction robot system 100 to perform a machine interpretation phase S2, and reads one of the building models A of the model database 13 during the machine interpretation phase S2 of the intelligent construction robot system 100 and automatically generates another new building model A' and/or gives a construction instruction O to the construction robot 20. Wherein, the method and steps for the judging module 12 to execute the machine interpretation phase S2 will be described in detail in the following paragraphs.

The construction robot 20 comprises a point cloud sensor 21 and an execution unit 22. The point cloud sensor 21 is used to capture one of the construction environment parameters of the construction environment and form a point cloud data C and then transmit it to the control center 10. Wherein, the point cloud sensor 21 may use scanning methods such as, but not limited to, lidar scanning, infrared photography, depth camera, general camera, or binocular photography to obtain the construction environment parameters.

Further, the construction environment parameters contained in the point cloud data C include, for example, the exact dimensions of the objects (walls, beams, columns, etc.) in the construction environment.

Further, the point cloud data C may also comprise image data that represents the construction environment in 2D forms, such as a picture or a photo, so that the point cloud data C can be more complete and accurate.

Wherein, when the point cloud data C is used in the learning module 11 to execute the machine learning phase S1, it is compared and combined with one of the BIM data to form the building model A, so that a simulated environment parameter provided by the BIM data in the building model A can be corrected by the point cloud data C. At the same time, the building model A can also have building data provided by the BIM data, such as the construction steps of each object, the materials used in construction, the source of materials, etc., in the corresponding construction environment parameter.

Wherein, when the cloud data C is used in the judging module 12 to execute the machine interpretation phase S2, the judging module 12 selects one of the building models A that is most similar to the cloud data C based on the construction environment parameters provided by the cloud data C, and generates a construction schedule based on the building data in the building model A, and gives a construction instruction O to the construction robot 20 according to the construction schedule.

Further, the construction schedule may be prioritized by using the properties of each object in the construction environment parameters. For example, the properties of each object in the construction environment parameters include the wall and the expected location of the door and window, as well as the beam located in the ceiling and the column connecting the ceiling and the floor, and the judging module 12 can then arrange the construction schedule in the sequence of beam, column, wall, door, and window according to the properties of each object in the building data.

Further, the judging module 12 compares each of the building models A based on the point cloud data C to evaluate the similarity between the point cloud data C and each of the building models A, and determines the most similar one of the building models A based on their similarity.

Further, the judging module 12 determines whether to generate another new building model A based on that similarity.

Further, the similarity may be presented in the form of numerical values, percentages, text, or images; and the method of evaluating the similarity may also be based on the principles of mathematical formulas, such as repeated percentages, distance/vector similarity, angular cosine, or correlation coefficients.

Preferably, the judging module 12 has a similarity threshold set according to the requirement, which is set in accordance with the method of presenting and/or evaluating the similarity as described above, and the judging module 12 uses the similarity threshold to determine whether to generate another new building model A'. For example, the similarity is presented as a percentage and the similarity threshold is set to 90%. At this point, the judging module 12 not only evaluates the building model A that is most similar to the point cloud data C, but also further confirms whether the similarity between the building model A and the point cloud data C is higher than the similarity threshold, and if the similarity exceeds the similarity threshold, then the building model A can be directly retrieved and used. If not, a new building model A' will be generated.

When the point cloud data C is used in the judging module 12 to execute the machine interpretation phase S2 to generate another building model A', the judging module 12 selects the building model A with the highest similarity and uses the point cloud data C to combine with the building model A to generate the updated building model A' and store it in the model database 13.

Wherein, regardless of whether the judging module 12 uses the building model A or generates the updated building model A', the intelligent construction robot system 100 simultaneously provides an adaptive modification of the building model A or the building model A' to a user, and similarly, the judging module 12 further stores the modified building model A, A' in the model database 13.

The execution unit 22 receives the construction instruction O from the judging module 12, executes a construction procedure in the construction environment in response to the construction instruction O, and feeds a construction progress F of the construction procedure to the control center 10. At this time, the judging module 12 will further update the construction schedule of the construction model A, A' with the construction progress F and store it in the model database 13 so that the latest progress of the construction schedule is immediately available when the construction model A, A' are later retrieved.

Further, the intelligent construction robot system 100 can communicatively connect the control center 10 with multiple construction robots 20 at the same time, so that the multiple construction robots 20 can be placed in different construction environments at the same time to obtain the point cloud data C of each construction environment. In this way, the intelligent construction robot system 100 can generate the corresponding building model A, A' based on the point cloud data C and give the construction instructions O to the construction robots 20 individually at the same time.

In addition, when there are multiple construction robots 20 operating simultaneously, since each construction robot 20 feeds each construction progress F for each construction model A, A', the judging module 12 can mobilize each construction robot 20 by using the updated construction schedule.

For example, after a first robot completes the cement application procedure in a first construction environment according to a first construction schedule and provides the construction progress F to the control center 10, the judging module 12 gives the first robot the construction instruction O to execute the next construction procedure according to the first construction schedule, since the cement material should be given a rest time to dry and cure, and when the rest time has elapsed and a second robot has completed the corresponding construction procedure in a second construction environment according to a second construction schedule, the judging module 12 can simultaneously judge the first construction schedule and the current construction progress F of the first robot to determine whether to mobilize the second robot to the first construction environment to continue the execution of the first construction schedule, such as painting the cement wall.

In this way, when the intelligent construction robot system 100 has multiple construction robots 20 operating simultaneously at the same time, each construction robot 20 is not limited to executing the construction instruction O in only one of the construction models A, A' (i.e., one of the construction schedules), but the judging module 12 can simultaneously judge multiple construction models A, A' and multiple construction schedules to deploy each construction robot 20 to execute the construction procedure among the construction schedules. Each construction schedule is not limited to only one construction robot 20, but also multiple construction robots 20 may simultaneously execute the same construction schedule and update the construction progress F.

The intelligent construction robot system 100 provided by the present invention, through the cooperation of the control center 10 and the construction robot 20, which can achieve the technology of automatically generating the building model A only by the point cloud data C, and further achieve the effect of scheduling and updating of each construction procedure, or even the cooperation of multiple construction robots 20 at the same time, achieves the feature of flexible deployment of multiple construction robots 20 and effectively improves the overall efficiency.

Figure 4:
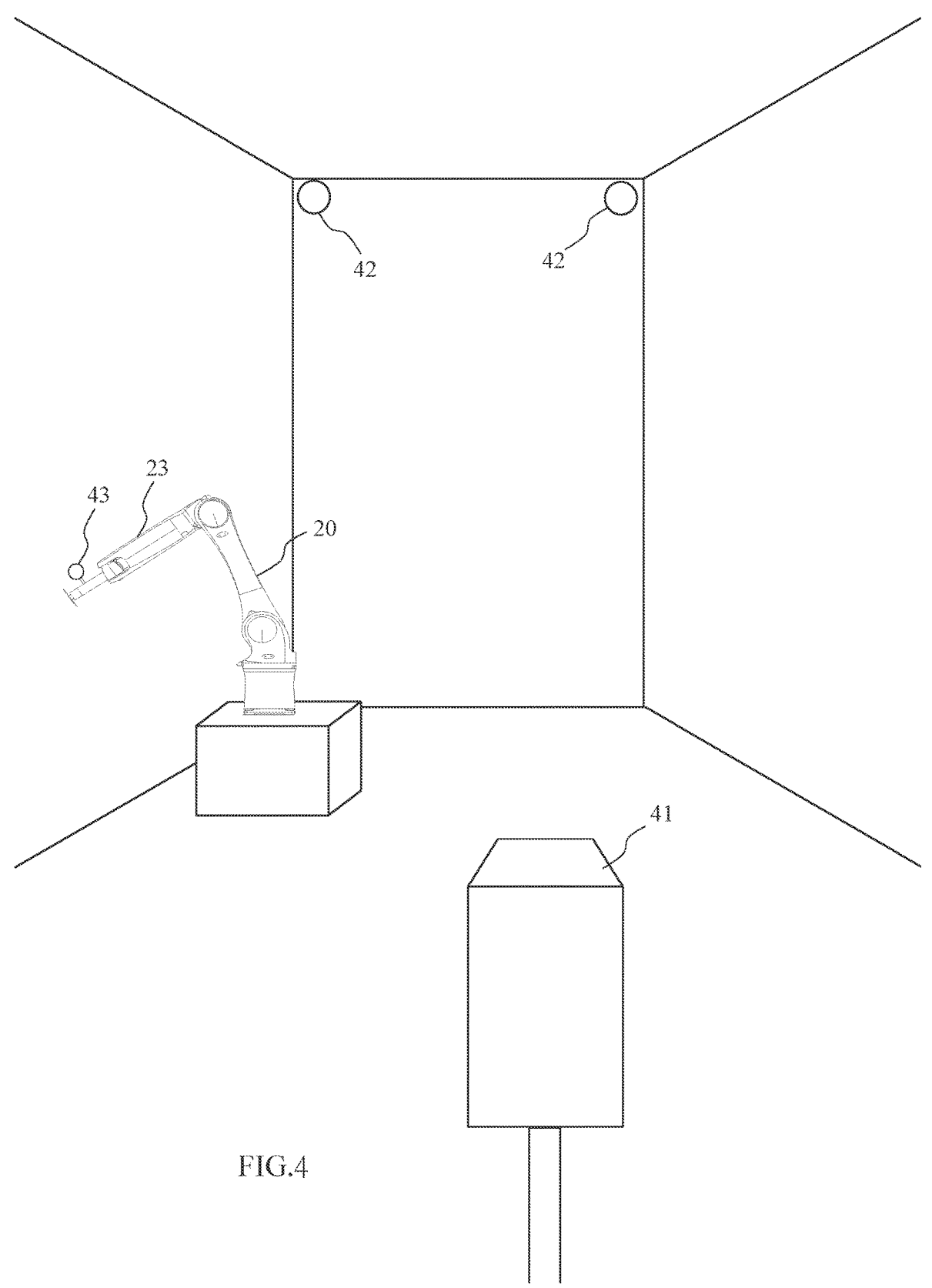
FIG. 4 is a schematic diagram of the preferred embodiment of the positioning system of the present invention.

Referring to FIG. 4, the intelligent construction robot system provided by the present invention further comprises a positioning system 40, which is constructed based on the building data of the building model A, A', for real-time positioning and dynamic correction of the construction robot 20.

In one embodiment, the positioning system 40 comprises a total station 41 and at least one dynamic reflector 43. The total station 41 is communicatively connected to the control center 10 and is installed in the construction environment where the absolute position of the total station 41 is recorded in the building model A, A', wherein the absolute position of the total station 41 is fixed and the dynamic reflector is a prism or a sticker with a reflective effect.

Wherein, it is not limited that in the method in which the building model A, A' records the absolute position of the total station 41, the total station 41 may be manually operated in the building model A, A' to mark the absolute position, or may be used in a manner similar to the above-mentioned point cloud sensor 21 to determine where the absolute position of the total station 41 is located.

The dynamic reflector element 43 is installed at any place on the construction robot 20. When the construction robot 20 carries out the construction procedure in the working environment, the total station 41 can receive the feedback from the dynamic reflector 43 on the construction robot 20 by the principle of an optical signal, so that the total station 41 can calculate the dynamic reflector 43 corresponding to the absolute position and a relative point of the building model A, A'. Through the combination of the positioning system 40 and the building model A, A', and the excellent characteristics of fast optical transmission, the total station 41 can achieve real-time detection, calculation of the dynamic reflector element 43 of the relative point and feedback to the control center 10, and recorded in the building model A, A'.

At the same time, the judging module 12 can use the relative point to confirm whether the position of the construction robot 20 during the construction procedure correctly corresponds to the construction schedule, and if the relative point of the construction robot 20 does not correspond to the construction schedule, it can immediately give the construction instruction O to the construction robot 20 for correction, thereby improving the construction quality of the construction robot 20 and effectively reducing the error frequency.

Preferably, the dynamic reflector 43 is installed on a robotic arm 23 of the construction robot 20 that performs the construction procedure, so that the relative point of the construction robot 20 can be accurately identified with its application position to the construction environment. For example, the dynamic reflector 43 is installed at the free end of the robotic arm 23 of the construction robot 20 so that when the construction robot 20 is painting, the relative position can be used to confirm the actual application position of the paint applied to the construction environment.

In another embodiment, the positioning system 40 further comprises at least one environmental reflector 42; and the total station 41 can move freely in the construction environment. The environmental reflector 42 is placed anywhere in the construction environment, and the total station 41 uses an optical path to emit optical signals, such as microwaves or infrared rays, which are reflected by the environmental reflector 42 and receive feedback, and calculates an absolute point of the environmental reflector 42 corresponding to the building model A, A'. Among them, the environmental reflector 42 may be the prism or the reflective effect sticker having the same as dynamic reflector.

In this way, when the construction environment is large, since the total station 41 has the mobility capability, it can achieve automatic dead-angle detection, and use the absolute point of the environmental reflector 42 to determine the relative point of the dynamic reflector 43 to achieve the function of monitoring and correcting the construction robot 20.

Further, since the relative points are simultaneously recorded in the building model A, A', the positioning system 40 can thereby be controlled by the judging module 12 to determine the movement path of the total station 41 in the construction environment. For example, the judging module 12 provides a detection command to the total station 41 to move the total station 41 toward the relative point noted on the building model A, A', and detects the dynamic reflector 43 of the construction robot 20 to obtain the relative point of the dynamic reflector 43 at that moment, and updates the building model A, A' finally.

The present invention further provides the intelligent construction robot system 100 in the machine learning phase S1, comprising the steps of:

S1-1: Loading the Building Information Modeling (BIM) data, hereinafter referred to as the BIM data for description, and, obtaining the point cloud data C of the construction environment, the point cloud data C contains the construction environment parameters and an image data corresponding to the construction environment;

S1-2: Applying an image segmentation technique to the image data, combining the construction environment parameters and the BIM data for machine learning to form the building model A; and S1-3: Storing the building model A in the model database 13.

The present invention further provides the intelligent construction robot system 100 in the machine interpretation phase S2, comprising the steps of:

S2-1: Obtaining the point cloud data C of the construction environment, the point cloud data C contains the parameters of the construction environment and an image data corresponding to the construction environment;

S2-2: Applying an image segmentation technique to the image data and combining the construction environment parameters to evaluate the similarity between each building model A and the point cloud data C in the model database 13, and selecting the building model A with the highest similarity to the point cloud data C;

S2-3: Evaluating whether the similarity exceeds the preset similarity threshold to determine whether to generate another new building model A'. If the similarity exceeds the similarity threshold, proceed to Step S2-4; if the similarity does not exceed the similarity threshold, proceed to Step S2-5;

S2-4: If the similarity exceeds the similarity threshold, building model A is directly retrieved, and the construction schedule is formed according to building model A.

S2-5: If the similarity does not exceed the similarity threshold, the building model A with the highest similarity is selected, and the point cloud data C is combined with the building model A to generate the updated building model A' to be stored in the model database 13, and the construction schedule is formed according to the updated building model A'.

Summarizing the above description of the implementation method and embodiments, the intelligent construction robot system and the method generating the interpretation provided by the present invention could produce the following effects:

1. Through the machine learning phase S1, the intelligent construction robot system 100 generates the building model A including both the actual construction environment parameters of the construction environment and building data of the BIM data, so as to avoid the problem that the construction environment and the data are incompatible with each other during the construction in the past, which would affect the construction efficiency.

2. Through the judging module 12 to execute the machine interpretation phase S2, only the point cloud data C can be used to form the corresponding building model A, A', so that even if the intelligent construction robot system 100 is used in the new construction environment, it can directly generate a new building model A', without having to return to the machine learning phase S1 to combine with the BIM data, so that the intelligent construction robot system 100 can be applied mechanically, saving the preliminary preparation time.

3. When there are multiple construction robots 20 working together, the judging module 12 can use the updated construction schedules to mobilize the construction robots 20 between the building models A, A' and the multiple construction schedules, improving the overall efficiency.

4. Through the technology of combining the positioning system 40 and the building model A, A', the intelligent construction robot system 100 can monitor the relative point of each construction robot 20 in real time, and achieve the effect of immediate correction to reduce the error rate.

What is claimed is:

1. A construction robot controlling system, comprising:

a control center, implemented by a computer device comprising electronic hardware and software having input, output, computation, storage, and control functions, and further comprising a visual interface for human interaction, the control center being configured to execute construction modeling and scheduling operations; wherein the control center is signal communicatively connected to a construction robot via a wired or wireless communication network; the construction robot, comprising: a point cloud sensor configured to capture construction environment parameters and generate point cloud data including three-dimensional geometric data and corresponding image data; and an execution unit configured to receive construction instructions from the control center and perform a physical construction procedure in a real construction environment; wherein the control center further comprises: (a) a learning module configured to: receive Building Information Modeling (BIM) data and the point cloud data; apply an image segmentation technique to the image data; fuse the segmented image data with the BIM data and the point cloud data to generate a building model that includes both simulated environment parameters and corrected real-world geometric parameters; and store the building model in a model database; (b) a construction model adaptation module configured to: receive new point cloud data from the construction robot; apply image segmentation to the new image data; compare the new point cloud data with stored building models in the model database to compute a similarity value; select a building model having the highest similarity; wherein the selected building model corresponds to a spatial location of the construction robot within the construction environment; determine, based on a preset similarity threshold, whether to: directly retrieve the selected building model, or combine the new point cloud data with the selected building model to generate an updated building model, and store the updated model in the model database; (c) wherein the construction model adaptation module is further configured to generate a construction schedule based on the selected or updated building model and transmit a construction instruction to the execution unit; wherein the construction schedule is generated based on the spatial correspondence between the point cloud data and the selected building model; (d) wherein the execution unit performs the construction procedure and feeds back construction progress to the control center; whereby the construction robot determines its working location within the construction environment and initiates execution of a corresponding construction procedure; and (e) wherein the construction model adaptation module updates the building model and the construction schedule in real time based on the construction progress.

2. The construction robot controlling system according to claim 1.

wherein the construction robot comprises a plurality of construction robots, each construction robot being configured to:

capture point cloud data of a respective construction environment and transmit the point cloud data to the control center, wherein the construction model adaptation module is further configured to:

compare the point cloud data captured by each construction robot with the building model stored in the model database, determine a spatial correspondence between the point cloud data and the building model for each construction robot, generate a construction schedule for each construction robot based on the determined spatial correspondence, whereby each construction robot determines its respective working location within the construction environment and initiates execution of a corresponding construction procedure, and wherein the construction schedules are arranged such that the plurality of construction robots perform construction procedures independently or sequentially based on the construction schedule.

3. The intelligent construction robot system according to claim 2, further including a positioning system, comprising:

a plurality of total stations communicatively connected to the control center and respectively installed in construction environments corresponding to the plurality of construction robots, wherein each total station is configured to capture optical signals from at least one dynamic reflector installed on a respective construction robot, and determine positional information of the construction robot, wherein the positional information is used by the construction model adaptation module to establish spatial correspondence between the point cloud data and the selected building model, whereby each construction robot determines its working location within the construction environment and executes a corresponding construction procedure based on the construction schedule.

4. The intelligent construction robot system according to claim 2, wherein the control center provides a detection command to the total station to detect a current relative point of each of the dynamic reflector and updates the current relative point in the determined building model or another building model.

5. The intelligent construction robot system according to claim 1 further including a positioning system, comprising:

a total station communicatively connected to the control center and installed in the construction environment, wherein the total station is configured to capture optical signals from at least one dynamic reflector installed on the construction robot and determine positional information of the construction robot, wherein the positional information is used by the construction model adaptation module to establish spatial correspondence between the point cloud data and the selected building model, whereby the construction robot determines its working location within the construction environment and initiates execution of a corresponding construction procedure.

6. The intelligent construction robot system according to claim 1, wherein the control center provides a detection command to each the two total station to detect a current relative point of each of the dynamic reflector and updates the current relative point in the determined building model or another building model.

* * * * *